United States Patent
Luo et al.

(10) Patent No.: US 12,432,756 B2
(45) Date of Patent: Sep. 30, 2025

(54) USER EQUIPMENT AND METHOD FOR TRANSMITTING S-SS/PSBCH BLOCK

(71) Applicant: Sharp Kabushiki Kaisha, Sakai (JP)

(72) Inventors: Chao Luo, Shanghai (CN); Renmao Liu, Shanghai (CN); Yinan Zhao, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 338 days.

(21) Appl. No.: 17/923,983

(22) PCT Filed: May 12, 2021

(86) PCT No.: PCT/CN2021/093309
§ 371 (c)(1),
(2) Date: Nov. 8, 2022

(87) PCT Pub. No.: WO2021/228136
PCT Pub. Date: Nov. 18, 2021

(65) Prior Publication Data
US 2023/0189302 A1 Jun. 15, 2023

(30) Foreign Application Priority Data
May 14, 2020 (CN) .......................... 202010410583.0

(51) Int. Cl.
*H04W 72/40* (2023.01)
*H04L 5/14* (2006.01)

(52) U.S. Cl.
CPC ........... *H04W 72/40* (2023.01); *H04L 5/1469* (2013.01)

(58) Field of Classification Search
CPC . H04W 72/40; H04W 72/0446; H04W 76/14; H04W 4/40; H04W 88/04; H04L 5/1469; H04L 5/14
See application file for complete search history.

(56) References Cited

U.S. PATENT DOCUMENTS

| | | | |
|---|---|---|---|
| 2022/0086836 A1* | 3/2022 | Ko | ............................ H04L 5/14 |
| 2022/0191862 A1* | 6/2022 | Hwang | ............. H04W 72/0446 |
| 2023/0142228 A1* | 5/2023 | Ko | ......................... H04L 5/0092 370/280 |

OTHER PUBLICATIONS

WO 2020/180098 A1 (Year: 2020).*
(Continued)

*Primary Examiner* — Rushil P. Sampat
(74) *Attorney, Agent, or Firm* — Keating & Bennett, LLP (57) ABSTRACT

A method performed by user equipment includes setting a content of a message in a physical sidelink broadcast channel (PSBCH) of a sidelink synchronization signal/physical sidelink broadcast channel (S-SS/PSBCH) block, including a content of 12 bits of the message to indicate a sidelink Time Division Duplex Configuration (sl-TDD-Config), and transmitting the S-SS/PSBCH block. The 12 bits includes 1 bit indicating whether a pattern 1 of a time division duplex Uplink Downlink Configuration Common (tdd-UL-DL-ConfigurationCommon) Time Division Duplex (TDD) configuration is used, or both of the pattern 1 and pattern 2 of the tdd-UL-DL-ConfigurationCommon TDD configuration are used. All of the 12 bits are set to '1' for a frequency division duplex (FDD), or for a spectrum indicated with a PC5 interface when at least the tdd-UL-DL-Configuration-Common is not provided in a System Information Block 1 (SIB1).

3 Claims, 1 Drawing Sheet

---

Set content of a message related to SL — S101

Transmit the message related to SL — S103

(56) References Cited

OTHER PUBLICATIONS

U.S. Appl. No. 62/975,697 (Year: 2020).*
Official Communication issued in International Patent Application No. PCT/CN2021/093309, mailed on Jul. 30, 2021.
LG Electronics et al., "New WID on 5G V2X with NR sidelink", 3GPP TSG RAN Meeting #83, RP-190766, Mar. 18-21, 2019, 8 pages.
NTT Docomo, Inc., "New WID on New Radio Access Technology", 3GPP TSG RAN Meeting #75, RP-170855, Mar. 6-9, 2017, 8 pages.
Huawei et al., "New WID on 3GPP V2X Phase 2", 3GPP TSG RAN Meeting #75, RP-170798, Mar. 6-9, 2017, 5 pages.
LG Electronics et al., "New WI proposal: Support for V2V services based on LTE sidelink", 3GPP TSG RAN Meeting #70, RP-152293, Dec. 7-10, 2015, 8 pages.
Vivo, "[102-e-NR-5G_V2X_NRSL-SYNC-01] Email discussion/approval regarding TDD configuration indication in PSBCH", 3gpp_tsg_ran_wg1@list.etsi.org, Aug. 17-25, 2020, 8 pages.
Moderator (CATT), "Text proposal from Email discussion thread #01 for AI 7.2.4.3 Sidelink synchronization mechanism", 3GPP TSG RAN WG1 Meeting #102-e, R1-2007369, Aug. 17-28, 2020, 2 pages.

* cited by examiner

USER EQUIPMENT AND METHOD FOR TRANSMITTING S-SS/PSBCH BLOCK

TECHNICAL FIELD

The present invention relates to a method performed by user equipment, and user equipment.

BACKGROUND

In 5G V2X, TDD configuration information needs to be indicated in a field having a limited size (e.g., a size of 12 bits) in SL system configuration information (e.g., a MasterInformationBlockSidelink message). This brings challenges to design of the field, e.g., how to assign information indicated by each code point in the field.

PRIOR ART DOCUMENTS

Non-Patent Documents

Non-Patent Document 1: RP-152293, New WI proposal: Support for V2V services based on LTE sidelink
Non-Patent Document 2: RP-170798, New WID on 3GPP V2X Phase 2
Non-Patent Document 3: RP-170855, New WID on New Radio Access Technology
Non-Patent Document 4: RP-190766, New WID on 5G V2X with NR sidelink

SUMMARY

In order to solve at least a part of the above problems, provided in the present invention are a method performed by user equipment and user equipment, which effectively combine parameter values of TDD configuration in SL common control information, thereby achieving effective indication of the TDD configuration.

According to the present invention, provided is a method performed by user equipment, comprising: setting content of a message of 12 bits in a PSBCH of an S-SS/PSBCH block; and transmitting the S-SS/PSBCH block. One bit of the 12 bits is used to indicate whether pattern 1 is used or both of pattern 1 and pattern 2 are used for TDD configuration, and for FDD, or for a spectrum supporting only a PC5 interface and not provided with the TDD configuration, the 12 bits are all set to '1'.

In addition, according to the present invention, provided is user equipment, comprising: a processor; and a memory, having instructions stored therein, wherein when run by the processor, the instructions perform the aforementioned method.

Therefore, provided in the present invention is a method, which effectively combines parameter values of TDD configuration in SL common control information, thereby achieving effective indication of the TDD configuration.

BRIEF DESCRIPTION OF THE DRAWINGS

The above and other features of the present invention will be more apparent from the following detailed description in combination with the accompanying drawings, in which.

DETAILED DESCRIPTION

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

In the following description, a 5G mobile communication system and its later evolved versions are used as exemplary application environments to set forth a plurality of embodiments according to the present invention in detail. However, it is to be noted that the present invention is not limited to the following implementations, but is applicable to many other wireless communication systems, such as a communication system after 5G and a 4G mobile communication system before 5G.

Some terms involved in the present invention are described below. Unless otherwise specified, the terms used in the present invention adopt the definitions herein. The terms given in the present invention may vary in LTE, LTE-Advanced, LTE-Advanced Pro, NR, and subsequent communication systems, but unified terms are used in the present invention. When applied to a specific system, the terms may be replaced with terms used in the corresponding system.

3GPP: 3rd Generation Partnership Project
AGC: Automatic Gain Control
AL: Aggregation Level
AS: Access Stratum
BWP: Bandwidth Part
CA: Carrier Aggregation
CCE: Control Channel Element
CORESET: Control Resource Set
CP: Cyclic Prefix
CP-OFDM: Cyclic Prefix Orthogonal Frequency Division Multiplexing
CRB: Common Resource Block
CRC: Cyclic Redundancy Check
CSI: Channel-State Information
CSS: Common Search Space
DC: Dual Connectivity
DCI: Downlink Control Information
DFN: Direct Frame Number
DFT-s-OFDM: Discrete Fourier Transformation Spread Orthogonal Frequency Division Multiplexing
DL: Downlink
DL-SCH: Downlink Shared Channel
DM-RS: also referred to as DMRS, Demodulation Reference Signal
eMBB Enhanced Mobile Broadband, (enhanced mobile broadband communication)
eNB: E-UTRAN Node B
E-UTRAN: Evolved UMTS Terrestrial Radio Access Network
FDD: Frequency Division Duplex
FDRA: Frequency Domain Resource Assignment
FR1: Frequency Range 1
FR2: Frequency Range 2
GLONASS: GLObal NAvigation Satellite System
gNB: NR Node B
GNSS: Global Navigation Satellite System GPS: Global Positioning System
HARQ: Hybrid Automatic Repeat Request
ID: Identity (or Identifier)
IE: Information Element
IP: Internet Protocol
LCID: Logical Channel ID, Logical Channel Identifier
LSB: Least Significant Bit
LTE: Long Term Evolution
LTE-A: Long Term Evolution-Advanced
MAC: Medium Access Control
MAC CE: MAC Control Element
MCG: Master Cell Group
MIB: Master Information Block
MIB-SL: Master Information Block-Sidelink
MIB-SL-V2X: Master Information Block-Sidelink-Vehicle to Everything
MIB-V2X: Master Information Block-Vehicle to Everything
MSB: Most Significant Bit
mMTC: massive Machine Type Communication
NAS: Non-Access Stratum
NDI: New Data Indicator
NR: New Radio
NUL: Normal Uplink
OFDM: Orthogonal Frequency Division Multiplexing
PBCH: Physical Broadcast Channel
PDCCH: Physical Downlink Control Channel
PDCP: Packet Data Convergence Protocol.
PDSCH: Physical Downlink Shared Channel
PSBCH: Physical Sidelink Broadcast Channel
PSCCH: Physical Sidelink Control Channel
PSFCH: Physical Sidelink Feedback Channel
PSSCH: Physical Sidelink Shared Channel
PRB: Physical Resource Block
PSS: Primary Synchronization Signal
PSS-SL: Primary Synchronization Signal for Sidelink
PSSS: Primary Sidelink Synchronization Signal
PTAG: Primary Timing Advance Group
PUSCH: Physical Uplink Shared Channel
PUCCH: Physical Uplink Control Channel
QCL: Quasi Co-Location
QoS: Quality of Service
QZSS: Quasi-Zenith Satellite System
RAR: Random Access Response
RB: Resource Block
RE: Resource Element
REG: Resource-Element Group
RF: Radio Frequency
RLC: Radio Link Control
RNTI: Radio Network Temporary Identifier
RRC: Radio Resource Control
RV: Redundancy Version
S-BWP: Sidelink Bandwidth Part
S-MIB: Sidelink Master Information Block
S-PSS: Sidelink Primary Synchronization Signal
S-SSB: Sidelink SS/PBCH Block (Sidelink Synchronization Signal/Physical Broadcast Channel Block)
S-SSS: Sidelink Secondary Synchronization Signal
SCG: Secondary Cell Group
SCI: Sidelink Control Information
SCS: Subcarrier Spacing
SDAP: Service Data Adaptation Protocol
SFN: System Frame Number
SIB: System Information Block
SL: Sidelink
SL BWP: Sidelink Bandwidth Part
SL MIB: Sidelink Master Information Block
SL PSS: Sidelink Primary Synchronization Signal
SL SS: Sidelink Synchronization Signal
SL SSID: Sidelink Synchronization Signal Identity (or Sidelink Synchronization Signal Identifier)
SL SSB: Sidelink SS/PBCH Block (Sidelink Synchronization Signal/Physical Broadcast Channel Block)
SL SSS: Sidelink Secondary Synchronization Signal
SLSS: Sidelink Synchronization Signal
SLSS ID: Sidelink Synchronization Signal Identity (or Sidelink Synchronization Signal Identifier)
SLSSID: Sidelink Synchronization Signal Identity (or Sidelink Synchronization Signal Identifier)
SpCell: Special Cell
SRS: Sounding Reference Signal
SSB: SS/PBCH Block (Synchronization Signal/Physical Broadcast Channel Block)
SSB-SL: SS/PBCH Block for Sidelink (Sidelink Synchronization Signal/Physical Broadcast Channel Block)
SSS: Secondary Synchronization Signal SSS-SL: Secondary Synchronization Signal for Sidelink
SSSB: Sidelink SS/PBCH Block (Sidelink Synchronization Signal/Physical Broadcast Channel Block)
SSSS: Secondary Sidelink Synchronization Signal
STAG: Secondary Timing Advance Group
Sub-channel Sub-channel
SUL: Supplementary Uplink
TA Timing Advance
TAG Timing Advance Group
TB: Transport Block
TCP: Transmission Control Protocol
TDD: Time Division Duplex
TPC: Transmit Power Control
UE: User Equipment
UL: Uplink
UMTS: Universal Mobile Telecommunications System
URLLC: Ultra-Reliable and Low Latency Communication
USS: UE-specific Search Space
V2I: Vehicle-to-Infrastructure
V2N: Vehicle-to-Network
V2P: Vehicle-to-Pedestrian
V2V: Vehicle-to-Vehicle
V2X: Vehicle-to-Everything
VRB: Virtual Resource Block Unless otherwise specified, in all embodiments and implementations of the present invention:

Optionally, "V2X communication", "V2X SL communication", and "SL V2X communication" are interchangeable with each other where applicable.

Optionally, in the case that the context is clear, it may be considered that one DL carrier, one UL carrier, and optionally one SUL carrier may be configured in a TDD cell. The UL carrier may also be referred to as a "non-SUL carrier".

Optionally, in the case that the context is clear, it may be considered that in a TDD cell, a "non-SUL carrier" is a "UL carrier". For example, a TDD cell may be configured with one UL carrier, referred to as "non-SUL carrier". As another example, a TDD cell may be configured with two UL carriers, one of which is a "non-SUL carrier" and the other is a "SUL carrier".

Optionally, "send" and "transmit" are interchangeable with each other where applicable.

Optionally, "in an SL carrier" and "on an SL carrier" are interchangeable with each other where applicable.

Optionally, "in an SL BWP" and "on an SL BWP" are interchangeable with each other where applicable.

Optionally, if $S_1$ is a set, then a subset of $S_1$ may be a set of zero or one or a plurality of (including all) elements in $S_1$.

Optionally, if $S_1$ and $S_2$ are two sets, then $S_1-S_2$ represents a "difference set" of the set $S_1$ and the set $S_2$, namely a set of elements in the set $S_1$ not belonging to the set $S_2$.

Optionally, if $S_1$ and $S_2$ are two sets, then $S_1-S_2=\{x|x\in S_1 \text{ and } x\notin S_2\}$.

Optionally, performing operations (such as filtering, transformation, etc.) on elements in the set $S_1$ to acquire a set $S_2$ can be equivalent to directly performing operations on the original set $S_1$ to acquire an updated set $S_1$.

Optionally, "higher layer" may refer to one or more protocol layers or protocol sub-layers above a physical layer. For example, a MAC layer, an RLC layer, a PDCP layer, a PC5 RRC layer, a PC5-S layer, an RRC layer, a V2X layer, an application layer, a V2X application layer, or the like.

Optionally, "pre-configuration" may be pre-configuration performed by means of a higher-layer protocol/signaling. For example, it is pre-configured in a specific storage location in the UE (for example, it is pre-configured according to the specification of the higher layer protocol), or it is pre-configured in a specific accessible storage location in the UE (for example, it is pre-configured according to the specification of the higher layer protocol).

Optionally, "configuration" may be configuration performed by means of a higher layer protocol/signaling. For example, configuration is performed for the UE by means of RRC signaling.

Optionally, a time-domain resource may also be referred to as a time resource.

Optionally, a frequency-domain resource may also be referred to as a frequency resource.

Optionally, "symbol" refers to "OFDM symbol".

Optionally, in a slot, OFDM symbol numbers may start from 0. For example, for a normal CP, a set of OFDM symbol numbers in a slot may be $\{0, 1, \ldots, 13\}$. As another example, for an extended CP, a set of OFDM symbol numbers in a slot may be $\{0, 1, \ldots, 11\}$.

Optionally, the resource block may refer to a virtual resource block (VRB), or may refer to a physical resource block (PRB), or may refer to a common resource block (CRB), or may refer to a resource block defined in other manners.

Optionally, subchannel (or sub-channel) numbers may start from 0. For example, if the number of sub-channels configured in the resource pool is $N_{subchannel}^{SL}$, then a set of numbers of sub-channels may be $\{0, 1, \ldots, N_{subchannel}^{SL}-1\}$.

Optionally, in a resource block, subcarrier numbers may start from 0. For example, a set of subcarrier numbers in a resource block may be $\{0, 1, \ldots, 11\}$.

Optionally, a parameter value of the size of L bits may be represented by one integer value (e.g., 0, 1, 2, etc.), and may also equivalently be represented by a bit string (e.g., a bit string having the length of L, e.g., '$b_0b_1 \ldots b_{L-1}$') corresponding to the integer.

Wherein,

Optionally, in the bit string '$b_0b_1 \ldots b_{L-1}$', the first (i.e., the leftmost) bit (i.e., $b_0$) is the most significant bit, and the last (i.e., the rightmost) bit (i.e., $b_{L-1}$) is the least significant bit. For example, if L=3, and the parameter value is represented by the bit string "011", then the value of the most significant bit of the parameter is 0.

Optionally, in the bit string '$b_0b_1 \ldots b_{L-1}$', the first (i.e., the leftmost) bit (i.e., $b_0$) is the least significant bit, and the last (i.e., the rightmost) bit (i.e., $b_{L-1}$) is the most significant bit. For example, if L=3, and the parameter value is represented by the bit string "011", then the value of the least significant bit of the parameter is 0.

For example, if L=1, then the parameter values of 0 and 1 may respectively correspond to '0' and '1'.

As another example, if L=4, then the parameter values of 0, 1, 2, 3, 4, 5, 6, 7, 8, 9, 10, 11, 12, 13, 14, and 15 may respectively correspond to '0000', '0001', '0010', '0011', '0100', '0101', '0110', '0111', '1000', '1001', '1010', '1011', '1100', '1101', '1110', and '1111'.

As another example, if L=7, then the parameter values of 0, 1, . . . , 126, and 127 may respectively correspond to '0000000', '0000001', . . . , '1111110', and '1111111'.

In communication based on device to device (D2D) technology, an interface between devices (also referred to as user equipment (UE)) may be referred to as a PC5 interface. A corresponding transmission link on a physical layer may be referred to as a "direct link" or "sidelink" (SL for short) so as to be distinguished from an uplink (UL for short) and a downlink (DL for short). Communication based on an SL may be referred to as sidelink (SL) communication. An SL based on LTE technology may be referred to as an LTE SL. An SL based on NR technology may be referred to as an NR SL. 5G V2X communication may be based on an LTE SL or an NR SL. Hereinafter, "SL" refers to an NR SL unless otherwise specified.

A physical layer of an SL can support transmissions in one or more modes, such as broadcast transmission, groupcast transmission, unicast transmission, and the like, in one or more of in-coverage, out-of-coverage, and partial-coverage scenarios.

For frequency range 1 (FR1), a subcarrier spacing (SCS, denoted as $\Delta f$, in units of kHz) corresponding to the SL may be 15 kHz (normal CP), or 30 kHz (normal CP), or 60 kHz (normal CP or extended CP). For frequency range 2 (FR2), an SCS corresponding to the SL may be 60 kHz (normal CP or extended CP), or 120 kHz (normal CP). Each SCS corresponds to one SCS configuration (denoted as μ). For example, $\Delta f$=15 kHz corresponds to μ=0, $\Delta f$=30 kHz corresponds to μ=1, $\Delta f$=60 kHz corresponds to μ=2, $\Delta f$=120 kHz corresponds to μ=3, and so on. As another example, for any given p, $\Delta f=2^{\mu} \cdot 15$ kHz. μ may be an SCS configuration of an SL carrier. For example, all SL transmissions in one SL carrier use the same SCS configuration and/or the same CP. p may be an SCS configuration of a sidelink bandwidth part (SL BWP, or referred to as S-BWP, or referred to as SBWP, or referred to as SL-BWP, or referred to as BWP-SL, or referred to as BWP for short). For example, all SL transmissions in one SL BWP use the same SCS configuration and/or the same CP. μ may be an SCS configuration of a resource pool. For example, all SL transmissions in a resource pool use the same SCS configuration and/or the same CP.

Signals and channels related to an SL operation may include:

an SL PSS (sidelink primary synchronization signal), or referred to as an S-PSS, or referred to as an SPSS, or referred to as an SL-PSS, or referred to as a PSS-SL, or referred to as a PSSS (primary sidelink synchronization signal), or the like;

an SL SSS (sidelink secondary synchronization signal), or referred to as an S-SSS, or referred to as an SSSS (sidelink secondary synchronization signal), or referred to as an SL-SSS, or referred to as an SSS-SL, or referred to as an SSSS (secondary sidelink synchronization signal), or the like;

PSBCH: Physical Sidelink Broadcast Channel;
PSCCH: Physical Sidelink Control Channel;
PSSCH: Physical Sidelink Shared Channel;
PSFCH: Physical Sidelink Feedback Channel.

The SL PSS, the SL SSS, and the PSBCH may be organized together into a block on a time/frequency resource. The block is referred to as, for example, an S-SSB (sidelink synchronization signal/PSBCH block, or SSS/PSBCH block), or is referred to as an SSS/PSBCH block, or is referred to as an SS/PSBCH block, or is referred to as an S-SS/PSBCH block, or is referred to as an SL SSB, or is referred to as an SSSB, or is referred to as an SL-SSB, or is referred to as an SSB-SL. A transmission bandwidth (for example, 11 resource blocks) of the S-SSB may be located in a corresponding SL carrier (for example, located in one SL BWP configured in the SL carrier). The SL PSS and/or the SL SSS may carry an SL SSID (sidelink synchronization identity, or sidelink synchronization identifier, or sidelink synchronization signal identity, or sidelink synchronization signal identifier, or referred to as SL-SSID, or referred to as SSID-SL, or referred to as SLSSID, or referred to as SLSS ID, or referred to as S-SSID, or the like), and the PSBCH may carry an SL MIB (sidelink master information block, or referred to as SL-MIB, or referred to as S-MIB, or referred to as MIB-SL, or referred to as MasterInformationBlock-Sidelink), which is configured by means of, for example, a parameter masterInformationBlockSidelink.

On the SL, a time-domain resource and/or a frequency-domain resource used to transmit the S-SSB may be configured by means of higher-layer parameter(s). For example, in the frequency domain, a location of the S-SSB in the frequency domain may be configured by means of a parameter absoluteFrequencySSB-SL (or a parameter sl-AbsoluteFrequencySSB-r16). As another example, in the time domain, one or more synchronization configuration items may be configured by means of a parameter sl-SyncConfigList-r16. In each synchronization configuration item, $N_{period}^{S-SSB}$ S-SSBs within an S-SSB period having a length of 16 frames can be configured by means of a parameter numSSBwithinPeriod-SL (or a parameter sl-NumSSB-WithinPeriod-r16). An index of a slot where an S-SSB having a number (or an index) of $i_{S-SSB}$ ($0 \le i_{S-SSB} \le N_{period}^{S-SSB}-1$) is located in the period having a length of 16 frames may be $N_{offset}^{S-SSB}+N_{interval}^{S-SSB} \cdot i_{S-SSB}$, wherein $N_{offset}^{S-SSB}$ may be configured by means of a parameter timeOffsetSSB-SL (or a parameter sl-TimeOffsetSSB-r16), and $N_{interval}^{S-SSB}$ may be configured by means of a parameter timeIntervalSSB-SL (or a parameter sl-TimeInterval-r16).

Sometimes, it may be considered that the time-domain resource and/or the frequency-domain resource configured for the S-SSB in the SL carrier corresponds to a candidate S-SSB (or referred to as S-SSB candidate). On a time-domain resource and/or a frequency-domain resource corresponding to one candidate S-SSB, one or more S-SSB transmissions (for example, respectively from different UEs) may exist at the same time, or no S-SSB transmission may exist.

Sometimes, a slot configured with an S-SSB (or configured with an S-SSB resource, or configured with a candidate S-SSB, or configured with a candidate S-SSB resource) may also be referred to as a slot configured with an SLSS (or configured with an SLSS resource). Vice versa.

A synchronization source (or referred to as a synchronization reference, or referred to as a synchronization reference source) related to SL synchronization may include a GNSS (global navigation satellite system), a gNB, an eNB, and UE (for example, NR UE, or LTE UE, or NR UE or LTE UE). UE serving as a synchronization source (for example, UE transmitting the S-SSB) may be referred to as SyncRef UE.

Examples of the GNSS may include the GPS (Global Positioning System), the GLONASS (GLObal NAvigation Satellite System), the BeiDou (Beidou Navigation Satellite System), the Galileo (Galileo Navigation Satellite System), the QZSS (Quasi-Zenith Satellite System), etc.

One or more (for example, one) SL BWPs may be configured in the SL carrier. In each SL BWP, a starting symbol for SL transmission in a slot supporting SL transmission may be configured by means of a parameter startSLsymbols (or a parameter sl-StartSymbol-r16) (for example, the symbol is numbered as $l_{start}^{SL}$ in the slot), and the number of symbols for SL transmission in the slot may be configured by means of a parameter lengthSLsymbols (or a parameter sl-LengthSymbols-r16) (for example, the number of symbols is denoted as $N_{length}^{SL}$). A value set of $l_{start}^{SL}$ may be denoted as $S_{start}^{SL}$, for example, $S_{start}^{SL}=\{0, 1, 2, 3, 4, 5, 6, 7\}$; a value set of $N_{length}^{SL}$ may be denoted as $S_{length}^{SL}$, for example, $S_{length}^{SL}=\{7, 8, 9, 10, 11, 12, 13, 14\}$. The "symbol for SL transmission" may be referred to as "SL symbol". If a set of SL symbols (in chronological order) in the slot is denoted as $\{l_1^{SL}, l_2^{SL}, \ldots, l_{N_{length}^{SL}}^{SL}\}$, then $l_1^{SL}=l_{start}^{SL}, l_2^{SL}=l_{start}^{SL}+1, \ldots, l_{N_{length}^{SL}}^{SL}=l_{start}^{SL}+N_{length}^{SL}-1\}$. For example, if $l_{start}^{SL}=7$, $N_{length}^{SL}=7$, then the set of SL symbols in the slot is $\{7, 8, 9, 10, 11, 12, 13\}$.

SL transmission can be performed only in a slot meeting a certain condition. For example, at least symbol $l_{start}^{SL}$, symbol $l_{start}^{SL}+1 \ldots$, and symbol $l_{start}^{SL}+N_{length}^{SL}-1$ in the slot are uplink symbols (for example, semi-statically configured uplink symbols). As another example, the slot needs to be in a slot set of a configured resource pool.

One or more resource pools may be configured in one SL BWP, and in each resource pool, in the frequency domain, a location of a starting resource block of a starting sub-channel of the resource pool in the SL BWP may be configured by means of a parameter startRB-Subchannel (or a parameter sl-StartRB-Subchannel-r16).

In the frequency domain, the number (denoted as $N_{subchannel}^{SL}$) of sub-channels occupied by the resource pool may be configured by means of a parameter numSubchannel (or a parameter sl-NumSubchannel-r16). The $N_{subChannel}^{SL}$ sub-channels may be consecutive in the frequency domain.

In the frequency domain, each sub-channel may consist of one or more resource blocks, and the specific number of resource blocks (referred to as a size of the sub-channel, for example, denoted as $n_{subChannelSize}$) may be configured by means of a parameter subchannelsize (or a parameter sl-SubchannelSize-r16). The $n_{subChannelSize}$ resource blocks may be consecutive in the frequency domain.

In the frequency domain, in an order from a low frequency to a high frequency, sub-channels in a resource pool may be respectively numbered as 0, 1, ..., $N_{subChannel}^{SL}-1$. A sub-channel numbered as i may be referred to as "sub-channel i" ($0 \le i \le N_{subChannel}^{SL}-1$).

In the time domain, one or more slots available for the resource pool (or belonging to the resource pool) and recurring periodically may be configured via a parameter timeresourcepool (or a parameter sl-TimeResource-r16) (for example, by means of a slot bitmap). A size of the period may be a predefined value, or may be configured by means of a parameter periodResourcePool (or a parameter sl-Period-r16).

Methods for allocating resources (such as time-domain resources, or frequency-domain resources, or code-domain resources) related to the SL operation may be classified as follows:

Mode 1: a base station schedules SL resource(s) for an SL transmission.

Mode 2: UE determines the SL resource(s) for an SL transmission (that is, the base station does not participate in scheduling of the SL resources). For example, UE performing an SL transmission operation autonomously determines the SL resource(s) for an SL transmission.

The UE may schedule data transmission via sidelink control information (SCI). The SL operation may support "two-stage SCI". $1^{st}$-stage SCI may include information such as resource reservation and/or resource allocation, so that all UEs monitoring the SL may perform sensing with respect to a resource reservation and/or resource allocation status. $2^{nd}$-stage SCI may include other information, such as information related to HARQ feedback and the like. Hereinafter, unless otherwise specified, when mentioned individually, "SCI" may include only the $1^{st}$-stage SCI, or may include only the $2^{nd}$-stage SCI, or may include both the $1^{st}$-stage SCI and the $2^{nd}$-stage SCI.

A format of the $1^{st}$-stage SCI may be SCI format 0-1 (or written as "SCI format 0_1"). The following are some examples of the information that can be included in the SCI format 0-1:

priority;
frequency resource assignment;
time resource assignment;
a resource reservation period; and
DMRS pattern.
a $2^{nd}$-stage SCI format.

A format of the $2^{nd}$-stage SCI may be SCI format 0-2 (or written as "SCI format 0_2"). The following are some examples of the information that can be included in the SCI format 0-2:

a source layer-1 identifier (source layer-1 ID, or referred to as layer-1 source ID, or referred to as physical layer source ID, or referred to as source ID (when the context is clear));
a destination layer-1 identifier (destination layer-1 ID, or referred to as layer-1 destination ID, or referred to as physical layer destination ID, or referred to as destination ID (when the context is clear));
a HARQ process identifier (HARQ process ID), or a HARQ process number;
a new data indicator (NDI); and
a redundancy version (RV).

The $1^{st}$-stage SCI may be carried on a PSCCH. The $2^{nd}$-stage SCI may be multiplexed, together with data to be transmitted, on a PSSCH associated with (or scheduled by) the PSCCH. The PSCCH and the PSSCH associated therewith may be multiplexed, in a certain manner, on the time-domain resource and/or the frequency-domain resource allocated for an SL transmission (for example, a sub-channel where a starting resource block of the PSCCH is located is a starting sub-channel of the PSSCH associated therewith.

As another example, the starting resource block of the PSCCH is a starting resource block of the starting sub-channel of the PSSCH associated therewith). In addition, it may be considered that the $1^{st}$-stage SCI and/or the corresponding $2^{nd}$-stage SCI schedules the PSSCH (or schedules transmission of the PSSCH, or schedules transmission of a TB carried on the PSSCH).

For a particular SL transmission including a PSCCH and/or a PSSCH, a transmitter may be referred to as TX UE, and a receiver may be referred to as RX UE. If the SL transmission is a groupcast transmission, or a unicast transmission, and if HARQ feedback is enabled, the PSFCH transmitted by the RX UE may carry feedback on the PSCCH and/or PSSCH transmitted by the TX UE, wherein the feedback may be referred to as "HARQ-ACK information". In some configurations, the HARQ-ACK information may be a positive acknowledgment (ACK), or a negative acknowledgment (NACK, or NAK). In some other configurations, the HARQ-ACK information may include only NACK.

In the time domain, PSFCH resources may recur periodically in a resource pool. For example, a corresponding period (referred to as, for example, "PSFCH period" or "PSFCH resource period," denoted as, for example, $N_{PSSCH}^{PSFCH}$, and in units of, for example, the number of slots) may be configured by means of a parameter periodPSFCHresource (or a parameter sl-PSFCH-Period-r16) (for example, $N_{PSSCH}^{PSFCH}=1$, or $N_{PSSCH}^{PSFCH}=2$, or $N_{PSSCH}^{PSFCH}=4$). $N_{PSSCH}^{PSFCH}=0$ may be used to indicate that no PSFCH resource is configured in a corresponding resource pool, and/or to indicate that HARQ feedback in the corresponding resource pool is disabled. For example, if a resource pool has not been configured with any PSFCH-related parameter (such as a parameter configured by means of sl-PSFCH-Config-r16), or if a PSFCH period configured in the parameter sl-PSFCH-Config-r16 is 0 slot, then it is indicated that the resource pool has not been configured with any PSFCH resource. Optionally, if a resource pool has been configured with the parameter sl-PSFCH-Config-r16, and if the PSFCH period configured in the parameter sl-PSFCH-Config-r16 is greater than 0 slot, then it is indicated that the resource pool has been configured with PSFCH resources.

Slots related to the PSFCH period may be "logical slots," that is, only slots belonging to a corresponding resource pool are included. For example, if slot 0 and slot 5 in a certain frame belong to time-domain resources of a certain resource pool, and if slots 1, 2, 3, and 4 do not belong to the time-domain resources of this resource pool, then slot 0 and slot 5 are two adjacent "logical slots" in the resource pool, and are respectively numbered as, for example, $t_q^{SL}$ and $t_{q+1}^{SL}$. In this example, if sl-PSFCH-Period-r16=1, then PSFCH resources are present in both slot 0 and slot 5.

In the frequency domain, PSFCH resources may be configured to be in one RB set (for example, a set of consecutive PRBs, or a set of partially or completely inconsecutive PRBs). For example, it is configured by means of a parameter sl-PSFCH-RB-Set.

Embodiment 1

A method performed by user equipment according to Embodiment 1 of the present invention will be described below with reference to FIG. 1.

Figure 1:
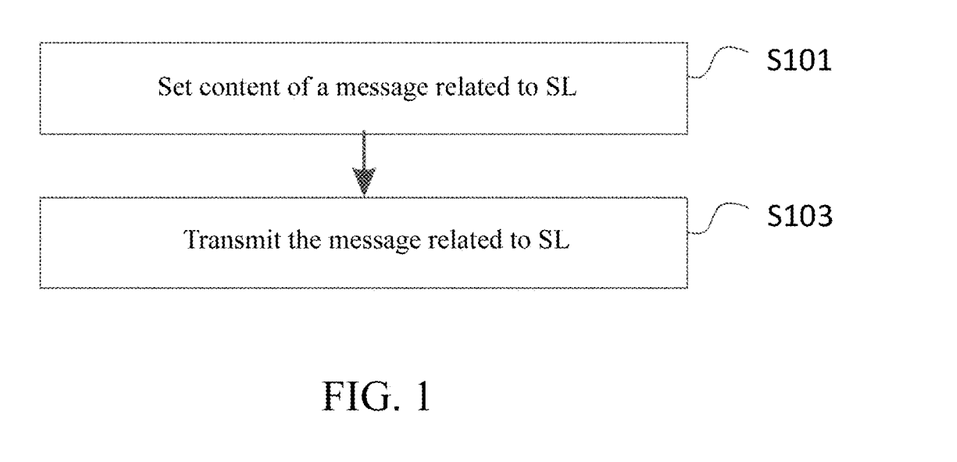
FIG. 1 is a flowchart showing a method performed by user equipment according to Embodiment 1 of the present invention.

FIG. 1 is a flowchart showing a method performed by user equipment according to Embodiment 1 of the present invention.

As shown in FIG. 1, in Embodiment 1 of the present invention, the steps performed by the user equipment (UE) include: step S101 and step S103.

Specifically, in step S101, content of a message related to SL is set. Wherein,

Optionally, step S101 is performed by a higher layer protocol (e.g., an RRC protocol) entity of the UE.

Optionally, the "message related to SL" is an RRC message.

Optionally, the "message related to SL" carries SL common control information.

Optionally, the "message related to SL" is carried on a PSBCH in an S-SSB.

Optionally, the "message related to SL" is a MasterInformationBlockSidelink message.

Optionally, the "message related to SL" corresponds to (or is associated with) one SL carrier (denoted as $C_{SL}$). Wherein Optionally, the SL carrier $C_{SL}$ is a carrier used to transmit the "message related to SL".

Optionally, the frequency (e.g., the starting frequency, or the center frequency, or the occupied frequency range, or the starting frequency and bandwidth, or the center frequency and bandwidth) of the SL carrier $C_{SL}$ is a frequency (denoted as $f_{SL}$) configured by the UE and used to transmit and/or receive NR SL communication.

Optionally, the SL carrier $C_{SL}$ may correspond to (or be associated with) a cell (denoted as E). For example, one or a plurality of the following are established (where applicable):

Optionally, only when the frequency for NR SL communication (e.g., the frequency of the SL carrier $C_{SL}$) is in coverage, the cell E is present.

Optionally, a carrier (denoted as $C_{Uu}$) of the cell E is configured with the same one or more parameters as SL carrier $C_{SL}$ (e.g., the absolute frequency of a point A, one or more SCSs and the carrier frequency (e.g., the starting frequency or the center frequency; e.g., represented by an offset from the point A, or represented by the absolute frequency) and/or the carrier bandwidth respectively corresponding to each SCS, etc.). In this case, optionally, it may be considered that the SL carrier $C_{SL}$ corresponds to (or is associated with) the carrier $C_{Uu}$.

Wherein,

Optionally, the carrier $C_{Uu}$ is a non-SUL carrier in the cell E.

Optionally, the carrier $C_{Uu}$ is a UL carrier in the cell E.

Optionally, the carrier $C_{Uu}$ is an SUL carrier in the cell E.

Optionally, the frequency $f_{SL}$ of the SL carrier $C_{SL}$ concerns the frequency (denoted as $f_{Uu}$) of the cell E.

Optionally, the cell E is a camped cell of the UE.

Optionally, the cell E is a serving cell of the UE.

As another example, the cell E is a primary cell (PCell) of the UE.

Optionally, the cell E is a primary SCG cell (PSCell) of the UE.

Optionally, the cell E is a special cell (SpCell) of the UE.

Optionally, the cell E is a secondary cell (SCell) of the UE.

Optionally, the SL carrier $C_{SL}$ may correspond to a carrier for SL communication (e.g., SL-based V2X communication). For example, the SL carrier $C_{SL}$ (or the spectrum corresponding to the SL carrier $C_{SL}$) is assigned specifically to be used for SL communication.

Optionally, the SL carrier $C_{SL}$ may correspond to a carrier for V2X communication. For example, the SL carrier $C_{SL}$ (or the spectrum corresponding to the SL carrier CO is assigned specifically to be used for V2X communication.

Optionally, the "message related to SL" corresponds to (or is associated with) an SCS (e.g., corresponding SCS configuration is denoted as $\mu_{SL}$), e.g., an SCS of the SL carrier $C_{SL}$, or an SCS of an SL BWP on the SL carrier $C_{SL}$, or an SCS of an SL BWP used to transmit the "message related to SL", or an SCS of a resource pool used to transmit the "message related to SL", or an SCS of an S-SSB carrying the "message related to SL".

Optionally, the "message related to SL" may contain one or a plurality of the following:

TDD configuration information, indicated by, for example, a parameter sl-TDD-Config. Wherein, The "TDD configuration information" may contain one or a plurality of the following:

number of patterns (e.g., the value thereof is denoted as $N_{patterns}$). Wherein, Optionally, the size of the "number of patterns" may be X bits, where X may be a predefined or pre-configured or a configured value. For example, X=1.

Optionally, the "number of patterns" may indicate the number of patterns corresponding to (or contained in) the "TDD configuration information".

Optionally, $N_{patterns}$=0 indicates that the number of patterns is 1, and in this case, the corresponding pattern may be referred to as "pattern 1"; $N_{patterns}$=1 indicates that the number of patterns is 2, and in this case, the corresponding two patterns may be respectively referred to as "pattern 1" and "pattern 2".

Optionally, $N_{patterns}$=1 indicates that the number of patterns is 1, and in this case, the corresponding pattern may be referred to as "pattern 1"; $N_{patterns}$=0 indicates that the number of patterns is 2, and in this case, the corresponding two patterns may be respectively referred to as "pattern 1" and "pattern 2".

Periodicity information (e.g., the value thereof is denoted as $I_{periods}$) Wherein, Optionally, the size of the "periodicity information" may be Y bits, where Y may be a predefined or pre-configured or a configured value. For example, Y=4.

Optionally, the "periodicity information" is used to indicate the period corresponding to the one pattern indicated by the "number of patterns" or the periods respectively corresponding to the two patterns indicated by the "number of patterns". For example, if the number of patterns indicated by the "number of patterns" is 1, then the "periodicity information" indicates the period (e.g., denoted as Q) of pattern 1. As another example, if the number of patterns indicated by the "number of patterns" is 2, then the "periodicity information" indicates the period (e.g., denoted as Q) of pattern 1 and the period (e.g., denoted as Q2) of pattern 2, which are, for example, denoted as <Q, Q2> by combining Q and Q2. Wherein, Optionally, the period Q is in units of milliseconds.

Optionally, the period Q2 is in units of milliseconds. For example, if the number of patterns indicated by the "number of patterns" is 1, then the set of the values of $I_{periods}$ may be {0, 1, 2, 3, 4, 5, 6, 7, 8} or {1, 2, 3, 4, 5, 6, 7, 8, 9}, or another subset (e.g. a subset of the size of 9) of the set {0, 1, 2, 3, 4, 5, 6, 7, 8, 9, 10, 11, 12, 13, 14, 15}. Correspondingly, the set of the values of Q may be {0.5, 0.625, 1, 1.25, 2, 2.5, 4, 5, 10}. The set of values of $I_{periods}$ may be mapped to the set of values of Q in a one-to-one correspondence in any order. For example, mapping is performed in a method shown in the following table.

TABLE 1

| $I_{periods}$ | Q |
|---|---|
| 0 | 0.5 |
| 1 | 0.625 |
| 2 | 1 |
| 3 | 1.25 |
| 4 | 2 |
| 5 | 2.5 |
| 6 | 4 |
| 7 | 5 |
| 8 | 10 |

As another example, if the number of patterns indicated by the "number of patterns" is 2, then the set of the values of $I_{periods}$ may be {0, 1, 2, 3, 4, 5, 6, 7, 8, 9, 10, 11, 12, 13, 14, 15}. Correspondingly, the set of the values of <Q, Q2> may be {<0.5, 0.5>, <0.625, 0.625>, <1, 1>, <0.5, 2>, <1.25, 1.25>, <2, 0.5>, <1, 3>, <2, 2>, <3, 1>, <1, 4>, <2, 3>, <2.5, 2.5>, <3, 2>, <4, 1>, <5, 5>, <10, 10>}. The set of values of $I_{periods}$ may be mapped to the set of the values of <Q, Q2> in a one-to-one correspondence in any order. For example, mapping is performed in a method shown in the following table.

TABLE 2

| $I_{periods}$ | <Q, Q2> |
|---|---|
| 0 | <0.5, 0.5> |
| 1 | <0.625, 0.625> |
| 2 | <1, 1> |
| 3 | <0.5, 2> |
| 4 | <1.25, 1.25> |
| 5 | <2, 0.5> |
| 6 | <1, 3> |
| 7 | <2, 2> |
| 8 | <3, 1> |
| 9 | <1, 4> |
| 10 | <2, 3> |
| 11 | <2.5, 2.5> |
| 12 | <3, 2> |
| 13 | <4, 1> |
| 14 | <5, 5> |
| 15 | <10, 10> |

UL slot information (e.g., the value thereof is denoted as $I_{UL}$).

Optionally, the size of the "UL slot information" may be Z bits, where Z may be a predefined or pre-configured or configured value. For example, Z=7.

Optionally, the "UL slot information" is used to indicate the number of UL slots in the period corresponding to one pattern indicated by the "number of patterns" or the numbers of UL slots in periods respectively corresponding to the two patterns indicated by the "number of patterns". For example, if the number of patterns indicated by the "number of patterns" is 1, then the "UL slot information" indicates the number (e.g., denoted as D) of UL slots in the period of pattern 1. As another example, if the number of patterns indicated by the "number of patterns" is 2, then the "UL slot information" indicates the number (e.g., denoted as D) of UL slots in the period of pattern 1 and the number (e.g., denoted as D2) of UL slots in the period of pattern 2, which are, for example, denoted as <D, D2> by combining D and D2.

Optionally, the SCS configuration corresponding to the "number of UL slots" is $\mu_{SL}$.

"In-coverage" indication, indicated by, for example, a parameter inCoverage. Wherein, Optionally, the "in-coverage" indication is the value of a BOOLEAN type.

Optionally, the "in-coverage" indication contains 1 bit.

A direct frame number, indicated by, for example, a parameter directFrameNumber. The direct frame number may indicate a frame number of a corresponding S-SSB (e.g., the S-SSB carrying the "message related to SL"). Wherein, Optionally, the "direct frame number" contains 10 bits.

A slot index (or referred to as a slot number), indicated by, for example, a parameter slotIndex. The slot index may indicate an index (or referred to as a number) of a slot in which the corresponding S-SSB (e.g., the S-SSB carrying the "message related to SL") is located, e.g., the slot number within a frame. Wherein, Optionally, the "slot index" contains 7 bits.

Reserved bits, indicated by, for example, a parameter reservedBits. Wherein,

Optionally, the "reserved bits" contain 2 bits.

Optionally, the "setting content of a message related to SL" includes: for each i, performing either of the two in the following (e.g., determining either of the two in the following in a predefined method):

If an SL setup condition i is satisfied, then an SL setup operation i is performed.

If the SL setup condition i is not satisfied, then the SL setup operation i is performed.

Wherein:

Optionally, 1≤i≤N. Wherein,

Optionally, N is a predefined integer.

Optionally, N≥1.

Optionally, each "SL setup condition i" may include one or a plurality of the following (in any combination of "and" or "or" where applicable):

The cell E provides a SIB12 message.

The primary cell of the UE provides a SIB12 message.

The UE is configured to receive NR SL (or NR SL communication).

The UE is configured to transmit NR SL (or NR SL communication).

The frequency for NR SL communication (e.g., the frequency of the SL carrier $C_{SL}$) is in coverage.

The frequency for NR SL communication (e.g., the frequency of the SL carrier $C_{SL}$) is out of coverage.

The frequency fa of the SL carrier $C_{SL}$ concerns the frequency $f_{Uu}$ of the cell E.

The SIB1 message contains the parameter tdd-UL-DL-ConfigurationCommon.

The SIB1 message does not contain the parameter tdd-UL-DL-ConfigurationCommon.

The parameter tdd-UL-DL-ConfigurationCommon in the SIB1 message contains pattern2.

The SIB1 message contains the parameter uplinkConfigCommon.

The SIB1 message does not contain the parameter uplinkConfigCommon.

The SIB1 message contains the parameter supplementary Uplink.

The SIB1 message does not contain the parameter supplementary Uplink.

The cell E is a TDD cell.

The cell E is an FDD cell.

The carrier $C_{Uu}$ is configured by means of the parameter uplinkConfigCommon.

The carrier $C_{Uu}$ is configured by means of the parameter supplementary Uplink.

The carrier $C_{Uu}$ is a non-SUL carrier of the cell E.

The carrier $C_{Uu}$ is an SUL carrier of the cell E.

The carrier $C_{Uu}$ is a UL carrier of the cell E.

The SL carrier $C_{SL}$ corresponds to a carrier for SL communication.

The SL carrier $C_{SL}$ corresponds to a carrier for V2X communication.

No applicable TDD configuration (e.g., TDD-specific physical channel configuration) is present. For example, the cell E is an FDD cell. As another example, the cell E is a TDD cell, and the carrier $C_{Uu}$ is an SUL carrier of the cell E. As another example, the SL carrier $C_{SL}$ corresponds to a carrier for SL communication. As another example, the SL carrier $C_{SL}$ corresponds to a carrier for V2X communication.

Optionally, each "SL setup operation i" may include one or a plurality of the following:

The value $N_{patterns}$ of the "number of patterns" is set to 0.

The value $N_{patterns}$ of the "number of patterns" is set to 1.

The value $N_{patterns}$ of the "number of patterns" is set to any value in {0, 1}.

The value $N_{patterns}$ of the "number of patterns" is set to the maximum value among all valid values (i.e., excluding the reserved or undefined value) thereof.

The value $N_{patterns}$ of the "number of patterns" is set to the minimum value among all valid values (i.e., excluding the reserved or undefined value) thereof.

The value $I_{periods}$ of the "periodicity information" is set to the value of $I_{periods}$ in the row corresponding to Q=P in the "mapping relationship of the set of the values of $I_{periods}$ to the set of the values of Q" (e.g., Table 1).

The value $I_{periods}$ of the "periodicity information" is set to the value of $I_{periods}$ in the row corresponding to <Q, Q2>=<P, P2> in the "mapping relationship of the set of the values of $I_{periods}$ to the set of the values of <Q, Q2>" (e.g., Table 2).

The value $I_{periods}$ of the "periodicity information" is set to 0.

The value $I_{periods}$ of the "periodicity information" is set to 1.

The value $I_{periods}$ of the "periodicity information" is set to 2.

The value $I_{periods}$ of the "periodicity information" is set to 3.

The value $I_{periods}$ of the "periodicity information" is set to 4.

The value $I_{periods}$ of the "periodicity information" is set to 5.

The value $I_{periods}$ of the "periodicity information" is set to 6.

The value $I_{periods}$ of the "periodicity information" is set to 7.

The value $I_{periods}$ of the "periodicity information" is set to 8.

The value $I_{periods}$ of the "periodicity information" is set to 9.

The value $I_{periods}$ of the "periodicity information" is set to 10.

The value $I_{periods}$ of the "periodicity information" is set to 11.

The value $I_{periods}$ of the "periodicity information" is set to 12.

The value $I_{periods}$ of the "periodicity information" is set to 13.

The value $I_{periods}$ of the "periodicity information" is set to 14.

The value $I_{periods}$ of the "periodicity information" is set to 15.

The value $I_{periods}$ of the "periodicity information" is set to any value in {0, 1, . . . , 15}.

The value $I_{periods}$ of the "periodicity information" is set to any value in {0, 1}.

The value $I_{periods}$ of the "periodicity information" is set to any value in {0, 1, 2}.

The value $I_{periods}$ of the "periodicity information" is set to any value in {0, 1, 2, 3}.

The value $I_{periods}$ of the "periodicity information" is set to any value in {0, 1, . . . , 4}.

The value $I_{periods}$ of the "periodicity information" is set to any value in {0, 1, . . . , 5}.

The value $I_{periods}$ of the "periodicity information" is set to any value in {0, 1, . . . , 6}.

The value $I_{periods}$ of the "periodicity information" is set to any value in {0, 1, . . . , 7}.

The value $I_{periods}$ of the "periodicity information" is set to any value in {0, 1, . . . , 8}.

The value $I_{periods}$ of the "periodicity information" is set to any value in {7, 8, . . . , 15}.

The value $I_{periods}$ of the "periodicity information" is set to any value in {8, 9, . . . , 15}.

The value $I_{periods}$ of the "periodicity information" is set to any value in {9, 10, . . . , 15}.

The value $I_{periods}$ of the "periodicity information" is set to any value in {10, 11, . . . , 15}.

The value $I_{periods}$ of the "periodicity information" is set to any value in {11, 12, . . . , 15}.

The value $I_{periods}$ of the "periodicity information" is set to any value in {12, 13, 14, 15}.

The value $I_{periods}$ of the "periodicity information" is set to any value in {13, 14, 15}.

The value $I_{periods}$ of the "periodicity information" is set to any value in {14, 15}.

The value $I_{periods}$ of the "periodicity information" is set to the maximum value among all valid values (i.e., excluding the reserved or undefined value) thereof.

The value $I_{periods}$ of the "periodicity information" is set to the minimum value among all valid values (i.e., excluding the reserved or undefined value) thereof.

The value $I_{UL}$ of the "UL slot information" is set to one of the following:

$u_1 \cdot 2^{\mu_{SL}-\mu_{ref}}$ $(u_1 \cdot P + u_2) \cdot 2^{\mu_{SL}-\mu_{ref}}$ $(u_1 + u_2 \cdot P) \cdot 2^{\mu_{SL}-\mu_{ref}}$ Wherein, Optionally, $u_1$ corresponds to the number of "UL slots" in pattern1 in the parameter tdd-UL-DL-ConfigurationCommon. For example, for NCP, if $l_{start}^{SL} \geq 14 - u_{sym}$, then $u_1 = u_{slots} + 1$, otherwise $u_1 = u_{slots}$. As another example, for ECP, if $l_{start}^{SL} \geq 12 - u_{sym}$, then $u_1 = u_{slots} + 1$, otherwise $u_1 = u_{slots}$. As another example, $u_1 = u_{slots}$.

Optionally, to, corresponds to the number of "UL slots" in pattern2 (if configured) in the parameter tdd-UL-DL-ConfigurationCommon. For example, for NCP, if $l_{start}^{SL} \geq 14 - u_{sym,2}$, then $u_2 = u_{slots,2} + 1$, otherwise $u_2 = u_{slots,2}$. As another example, for ECP, if $l_{start}^{SL} \geq 12 - u_{sym,2}$, then $u_2 = u_{slots,2} + 1$, otherwise $u_2 = u_{slots,2}$. As another example, $u_2 = u_{slots,2}$.

Optionally, if pattern2 in the parameter tdd-UL-DL-ConfigurationCommon is not configured, then to, =0.

The value $I_{UL}$ of the "UL slot information" is adjusted. For example, $I_{UL}$ is set to $I_{UL}/N$. Wherein, Optionally, only when pattern2 in the parameter tdd-UL-DL-ConfigurationCommon is configured, the value $I_{UL}$ of the "UL slot information" is adjusted.

Optionally, only when a UL slot information adjustment condition is satisfied, the value $I_{UL}$ of the "UL slot information" is adjusted.

For example, the value $I_{UL}$ of the "UL slot information" is adjusted according to the value N defined in Table 3.

Optionally, in the case that the value N is not defined, the value $I_{UL}$ of the "UL slot information" is not adjusted.

Optionally, in the case that the value N is not defined, the value $I_{UL}$ of the "UL slot information" is adjusted according to N=1.

TABLE 3

Value N corresponding to different combinations of <Q, Q2> and $\mu_{SL}$

| | $\mu_{SL}$ | | |
| --- | --- | --- | --- |
| <Q, Q2> | 1 | 2 | 3 |
| <1, 3> | | | 2 |
| <2, 2> | | | 4 |
| <3, 1> | | | 2 |
| <1, 4> | | | 4 |
| <2, 3> | | | 4 |
| <2.5, 2.5> | | | 4 |
| <3, 2> | | | 4 |
| <4, 1> | | | 4 |

TABLE 3-continued

Value N corresponding to different combinations of <Q, Q2> and $\mu_{SL}$

| | $\mu_{SL}$ | | |
| --- | --- | --- | --- |
| <Q, Q2> | 1 | 2 | 3 |
| <5, 5> | | 4 | 16 |
| <10, 10> | 4 | 16 | 64 |

The value $I_{UL}$ of the "UL slot information" is set to a predefined or pre-configured or configured value in the set {0, 1, ..., 127}, e.g., 0, 1, 2, 3, 4, 5, 6, 7, 8, 9, 118, 119, 120, 121, 122, 123, 124, 125, 126, or 127.

The value $I_{UL}$ of the "UL slot information" is set to any value in the set {0, 1, ..., 127}.

The value $I_{UL}$ of the "UL slot information" is set to any value in a predefined or pre-configured or configured subset of the set {0, 1, ..., 127}. The subset may be any subset of the set {0, 1, ..., 127}.

The value $I_{UL}$ of the "UL slot information" is set to the maximum value among all valid values (i.e., excluding the reserved or undefined value) thereof.

The value $I_{UL}$ of the "UL slot information" is set to the minimum value among all valid values (i.e., excluding the reserved or undefined value) thereof.

The value $I_{UL}$ of the "UL slot information" is set to a value corresponding to the maximum number of UL slots. For example, if the "number of patterns" indicates 1 pattern, then the value $I_{UL}$ of the "UL slot information" is set to the value of $I_{UL}$ corresponding to the case that the "UL slot information" indicates that the number D of UL slots in the period of pattern 1 is the maximum value. As another example, if the "number of patterns" indicates 2 patterns, then the value of the "UL slot information" is set to the value of $I_{UL}$ corresponding to the case that both D and D2 in the combination <D, D2> of the number of UL slots in the period of pattern 1 and the number of UL slots in the period of pattern 2 indicated by the "UL slot information" are both the maximum values.

The value $I_{UL}$ of the "UL slot information" is set to the value corresponding to the case that all slots in indicated (one or two) periods are UL slots. Optionally, in this case, the value of $I_{UL}$ satisfying the condition concerns one or a plurality of $\mu_{SL}$, $N_{patterns}$, or $I_{periods}$.

For example, the "setting content of a message related to SL" includes: if a TDD condition is not satisfied (or no applicable TDD configuration is present, for example, the SIB1 message does not contain the parameter tdd-UL-DL-ConfigurationCommon), then: setting the value $N_{patterns}$ of the "number of patterns" to 0, setting the value $I_{periods}$ of the "periodicity information" to 15, and setting the value $I_{UL}$ of the "UL slot information" to 127.

In addition, in step S103, the "message related to SL" is transmitted. For example, step S103 may include one or a plurality of the following:

Submitting the "message related to SL". For example, a higher layer protocol entity of the UE submits the "message related to SL" to a lower layer protocol entity (e.g., a physical layer entity) of the UE.

Transmitting the "message related to SL". For example, the lower layer protocol entity (e.g., the physical layer entity) of the UE transmits the "message related to SL".

Optionally, in Embodiment 1 of the present invention, "configured" may be replaced with "pre-configured."

Optionally, in Embodiment 1 of the present invention, "configured" may be replaced with "configured or pre-configured."

Optionally, in Embodiment 1 of the present invention, "not configured" may be replaced with "not pre-configured."

Optionally, in Embodiment 1 of the present invention, "not configured" may be replaced with "not configured and or not pre-configured."

Optionally, in Embodiment 1 of the present invention, "not configured" may be replaced with "not pre-configured."

Optionally, in Embodiment 1 of the present invention, the SIB1 message is a SIB1 message received by the UE.

Optionally, in Embodiment 1 of the present invention, the SIB1 message corresponds to (or belongs to) the cell E. For example, the cell E broadcasts the SIB1 message. As another example, the primary cell of the UE configures the SIB1 message of the cell E for the UE.

Optionally, in Embodiment 1 of the present invention, the SIB1 message corresponds to (or belongs to) the primary cell of the UE. For example, the primary cell of the UE broadcasts the SIB1 message.

Optionally, in Embodiment 1 of the present invention, each "pattern" corresponds to one pattern in TDD uplink and downlink configuration, e.g., a pattern defined by TDD-UL-DL-Pattern IE, or for example pattern1 or pattern2 in tdd-UL-DL-ConfigurationCommon in servingCellConfigCommon in the SIB1 message.

Optionally, in Embodiment 1 of the present invention, $\mu_{ref}$ corresponds to the value of the SCS configuration indicated by referenceSubcarrierSpacing in the parameter tdd-UL-DL-Configuration Common.

Optionally, in Embodiment 1 of the present invention, P, $u_{slots}$, and $u_{sym}$, respectively correspond to the value of the period indicated by dl-UL-TransmissionPeriodicity in pattern1 in the parameter tdd-UL-DL-ConfigurationCommon, the number of slots indicated by nrofUplinkSlots, and the number of symbols indicated by nrofUplinkSymbols.

Optionally, in Embodiment 1 of the present invention, P2, $u_{slots,2}$, and $u_{sym,2}$ respectively correspond to the value of the period indicated by dl-UL-TransmissionPeriodicity in pattern2 (if configured) in the parameter tdd-UL-DL-ConfigurationCommon, the number of slots indicated by nrofUplinkSlots, and the number of symbols indicated by nrofUplinkSymbols.

Optionally, in Embodiment 1 of the present invention, the "UL slot" (or referred to as "quasi-UL slot", or referred to as "candidate UL slot", or referred to as "quasi-SL slot", or referred to as "candidate SL slot") refers to a slot satisfying a UL slot condition. For a given slot 1, the UL slot condition refers to one or a plurality of the following (in any combination of "and" or "or" where applicable):

In slot l, symbol $l_{start}^{SL}$, symbol $l_{start}^{SL}+1$ ..., and symbol $l_{start}^{SL}+N_{length}^{SL}-1$ are configured to be uplink symbols.

In slot l, at least symbol $l_{start}^{SL}$, symbol $l_{start}^{SL}+1$ and symbol $l_{start}^{SL}+N_{length}^{SL}-1$ are configured to be uplink symbols.

In slot l, all symbols (for example, for NCP, symbol 0, symbol 1, ..., and symbol 13; as another example, for ECP, symbol 0, symbol 1, ..., and symbol 11) are configured to be uplink symbols.

In this manner, according to Embodiment 1, provided in the present invention is a method, which effectively combines parameter values of TDD configuration in SL common control information, thereby achieving effective indication of the TDD configuration.

Variant Embodiment

Figure 2:
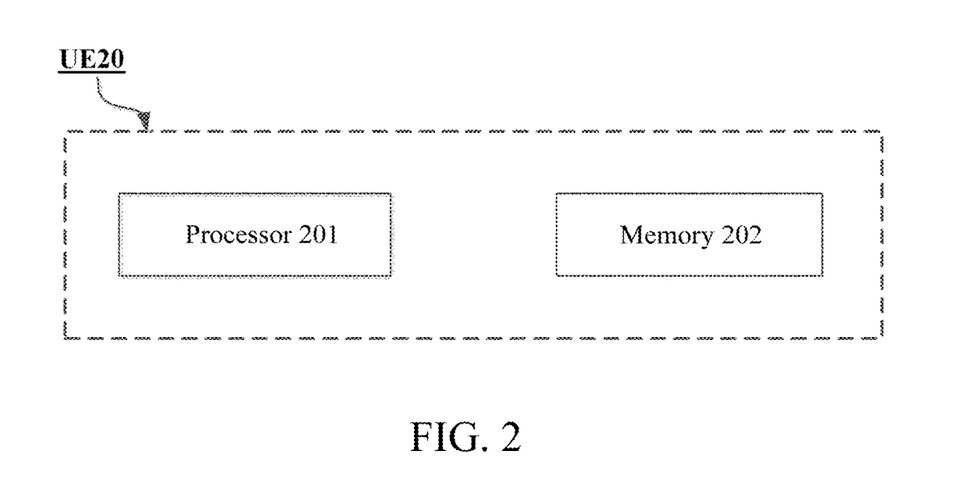
FIG. 2 shows a block diagram of user equipment (UE) according to the present invention.

Hereinafter, FIG. 2 is used to illustrate user equipment that can perform the method performed by user equipment described in detail above in the present invention as a variant embodiment.

FIG. 2 is a block diagram showing user equipment (UE) according to the present invention.

As shown in FIG. 2, user equipment (UE) 20 includes a processor 201 and a memory 202. The processor 201 may include, for example, a microprocessor, a microcontroller, an embedded processor, and the like. The memory 220 may, for example, include a volatile memory (for example, a random access memory (RAM)), a hard disk drive (HDD), a non-volatile memory (for example, a flash memory), or other memories. The memory 202 stores program instructions. The instructions, when run by the processor 201, may perform the method performed by user equipment as described above in detail in the present invention.

The methods and related equipment according to the present invention have been described above in combination with preferred embodiments. It should be understood by those skilled in the art that the methods shown above are only exemplary, and the above embodiments can be combined with one another as long as no contradiction arises. The methods of the present invention are not limited to the steps or sequences illustrated above. The network node and user equipment illustrated above may include more modules. For example, the network node and user equipment may further include modules that can be developed or will be developed in the future to be applied to a base station, an MME, or UE, and the like. Various identifiers shown above are only exemplary, and are not meant for limiting the present invention. The present invention is not limited to specific information elements serving as examples of these identifiers. A person skilled in the art could make various alterations and modifications according to the teachings of the illustrated embodiments. Those skilled in the art should understand that part of or all of the mathematical expressions, mathematical equations, or mathematical inequalities may be simplified (for example, incorporating constant terms, or interchanging two addition terms, or interchanging two multiplication terms, or the like) or transformed or rewritten to some extent. Mathematical expressions, mathematical equations, or mathematical inequalities before and after the simplification or transformation or rewriting may be considered to be equivalent to each other.

It should be understood that the above-described embodiments of the present invention may be implemented by software, hardware, or a combination of software and hardware. For example, various components of the base station and user equipment in the above embodiments can be realized through multiple devices, and these devices include but are not limited to: an analog circuit device, a digital circuit device, a digital signal processing (DSP) circuit, a programmable processor, an application specific integrated circuit (ASIC), a field programmable gate array (FPGA), and a complex programmable logic device (CPLD), and the like. In this application, the term "base station" may refer to a mobile communication data and control switching center having specific transmission power and a specific coverage area and including functions such as resource allocation and scheduling, data reception and transmission, and the like. "User equipment" may refer to a user mobile terminal, for example, including terminal devices that can communicate with a base station or a micro base station wirelessly, such as a mobile phone, a laptop computer, and the like.

In addition, the embodiments of the present invention disclosed herein may be implemented on a computer program product. More specifically, the computer program product is a product provided with a computer-readable medium having computer program logic encoded thereon. When executed on a computing device, the computer program logic provides related operations to implement the above technical solutions of the present invention. When executed on at least one processor of a computing system, the computer program logic enables the processor to execute the operations (methods) described in the embodiments of the present invention. Such an arrangement of the present invention is typically provided as software, a code, and/or other data structures that are configured or encoded on a computer-readable medium, such as an optical medium (e.g., a CD-ROM), a floppy disk or a hard disk, or, for example, firmware or other media of microcodes on one or more ROM or RAM or PROM chips, or downloadable software images, shared database and so on in one or more modules. Software or firmware or such configuration may be installed on a computing device such that one or more processors in the computing device perform the technical solutions described in the embodiments of the present invention.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general purpose processor may be a microprocessor, or the processor may be an existing processor, a controller, a microcontroller, or a state machine. The aforementioned general purpose processor or each circuit may be configured by a digital circuit or may be configured by a logic circuit. Furthermore, when advanced technology capable of replacing current integrated circuits emerges due to advances in semiconductor technology, the present invention can also use integrated circuits obtained using this advanced technology.

While the present invention has been illustrated in combination with the preferred embodiments of the present invention, it will be understood by those skilled in the art that various modifications, substitutions, and alterations may be made to the present invention without departing from the spirit and scope of the present invention. Therefore, the present invention should not be limited by the above-described embodiments, but should be defined by the appended claims and their equivalents.

The invention claimed is:

1. A method performed by a user equipment (UE) comprising:
setting a content of a message in a physical sidelink broadcast channel (PSBCH) of a sidelink synchronization signal/physical sidelink broadcast channel (S-SS/PSBCH) block, including a content of 12 bits of the message to indicate a sidelink Time Division Duplex Configuration (sl-TDD-Config), wherein
the 12 bits includes 1 bit indicating whether a pattern 1 of a time division duplex Uplink Downlink Common Configuration (tdd-UL-DL-ConfigurationCommon) is used, or both of the pattern 1 and a pattern 2 of the tdd-UL-DL-ConfigurationCommon are used, and
all of the 12 bits are set to '1' for a frequency division duplex (FDD), or for a spectrum indicated with a PC5 interface when at least the tdd-UL-DL-ConfigurationCommon is not provided in a System Information Block 1 (SIB1); and
transmitting the S-SS/PSBCH block.

2. A user equipment (UE) comprising:
a processor; and
a memory electrically communicated with the processor, wherein program instructions stored in the memory are executable to:
set a content of a message in a physical sidelink broadcast channel (PSBCH) of a sidelink synchronization signal/physical sidelink broadcast channel (S-SS/PSBCH) block, including a content of 12 bits of the message to indicate a sidelink Time Division Duplex Configuration (sl-TDD-Config), wherein
the 12 bits includes 1 bit indicating whether a pattern 1 of a time division duplex Uplink Downlink Common Configuration (tdd-UL-DL-ConfigurationCommon) is used, or both of the pattern 1 and a pattern 2 of the tdd-UL-DL-ConfigurationCommon are used, and
all of the 12 bits are set to '1' for a frequency division duplex (FDD), or for a spectrum indicated with a PC5 interface when at least the tdd-UL-DL-ConfigurationCommon is not provided in a System Information Block 1 (SIB1); and
transmit the S-SS/PSBCH block.

3. A user equipment (UE) comprising:
a processor; and
a memory electrically communicated with the processor, wherein program instructions stored in the memory are executable to:
receive a message in a physical sidelink broadcast channel (PSBCH) of a sidelink synchronization signal/physical sidelink broadcast channel (S-SS/PSBCH) block, including a content of 12 bits of the message to indicate a sidelink Time Division Duplex Configuration (sl-TDD-Config), wherein
the 12 bits includes 1 bit indicating whether a pattern 1 of a time division duplex Uplink Downlink Common Configuration (tdd-UL-DL-ConfigurationCommon) is used, or both of the pattern 1 and a pattern 2 of the tdd-UL-DL-ConfigurationCommon are used, and
all of the 12 bits are set to '1' for a frequency division duplex (FDD), or for a spectrum indicated with a PC5 interface when at least the tdd-UL-DL-ConfigurationCommon is not provided in a System Information Block 1 (SIB1).

* * * * *